United States Patent [19]
McNamee

[11] 3,934,902
[45] Jan. 27, 1976

[54] CONNECTOR FOR A CORRUGATED CONDUIT

[75] Inventor: James Arthur McNamee, Burlington, Mass.

[73] Assignee: RCA Corporation, New York, N.Y.

[22] Filed: Dec. 18, 1973

[21] Appl. No.: 425,735

[52] U.S. Cl.............. 285/156; 85/1 L; 85/33; 174/75 C; 285/393; 285/419; 285/DIG. 4
[51] Int. Cl.² ................................... F16L 41/00
[58] Field of Search ...... 285/DIG. 4, 393, 392, 419, 285/226, 384, 156, 250, 357, 356; 174/75 C, 88 C, DIG. 8; 85/33, 1 L

[56] References Cited
UNITED STATES PATENTS

| | | | |
|---|---|---|---|
| 919,913 | 4/1909 | Miller | 285/393 |
| 956,077 | 4/1910 | Greenfield | 285/393 |
| 1,736,145 | 11/1929 | Anderson | 285/393 |
| 2,014,355 | 9/1935 | Hussman | 285/226 X |
| 2,196,676 | 4/1940 | Johnson et al. | 285/226 X |
| 2,306,702 | 12/1942 | Koerner | 285/226 |
| 2,503,169 | 4/1950 | Phillips | 285/250 |
| 3,154,634 | 10/1964 | Rogers | 174/92 X |
| 3,291,895 | 12/1966 | Van Dyke | 174/88 C |
| 3,588,150 | 6/1971 | Wold | 174/DIG. 8 |
| 3,694,007 | 9/1972 | Crow et al. | 285/DIG. 4 |

FOREIGN PATENTS OR APPLICATIONS

| | | | |
|---|---|---|---|
| 1,101,562 | 3/1961 | Germany | 174/88 C |
| 286,413 | 3/1928 | United Kingdom | 285/250 |

*Primary Examiner*—Thomas F. Callaghan
*Attorney, Agent, or Firm*—Edward J. Norton; William Squire

[57] ABSTRACT

A connector for use with a plastic corrugated tubing is provided in which a first annular member is provided with an end face which is adjacent a projecting end of the tube when the annular member is disposed about the tube. The end face is disposed within a trough of one of the tube corrugations. An outer sleeve is threaded to the annular member and includes an inwardly depending flange having a face which is coextensive with the end face of the annular member. The two faces serve to clamp the projecting end of the conduit therebetween thereby clamping the connector to the conduit.

2 Claims, 3 Drawing Figures

CONNECTOR FOR A CORRUGATED CONDUIT

This invention was made in the course of or during work performed for the Department of the Army.

BACKGROUND OF THE INVENTION

The present invention relates to a connector which is adapted to be attached to a plastic flexible corrugated tube housing a plurality of electrical leads. The connector interconnects one or more corrugated tubes together or to a suitable mating apparatus. The provision of suitable connectors has recently become of increased importance in housing wiring harnesses in plastic corrugated tubing. The tubing is used in all types of electrical equipment to protect the wirings housed therein from abuse, wear and tear, and to improve the life thereof.

As is well known, a wiring harness, once assembled, is a continuous string of one or more wires formed into bundles which terminate in a number of branches.

In placing the corrugated tubing over the harness, it will thus be evident that T, Y and other arrangements are present at the junction of the various branches. Since the corrugated tubing is made from a continuous tube structure and is not molded for a particular wiring harness configuration, means need be provided for interconnecting the corrugated tubing on each of the branches together at the junctions thereof.

To this end, various fittings and connectors are supplied for interconnecting the tubings at the wiring harness junctions. However, these fittings include a number of elements connected thereto which are costly to fabricate and therefore add greatly to the expense in providing the corrugated housing.

One type of fitting includes an internal member disposed within the core of the corrugated tubing and, an external member placed about the outer surface of the corrugated tubing adjacent to the inner member. The members are then threaded or otherwise assembled together to wedge the tubing coaxially therebetween. However, this arrangement requires fabrication of the internal piece and the external piece as well as interconnecting members for connecting one tube to another. This arrangement is costly and complex.

SUMMARY OF THE INVENTION

In accordance with the present invention, a first annular member is provided having at least one corrugation formed in the surface thereof and terminates in an end face intersecting the surface. The end face intersects the one corrugation at a point spaced from the trough of the one corrugation. A second annular member has a surface thereof coextensive with and facing the end face. Means are provided connected to the first and second members for moveably securing the first member to the second member so as to translate the end face toward the facing surface. Connector engaging means are formed in one of the first and second members.

IN THE DRAWINGS

FIG. 1 is a partial fragmentary elevational view of a device constructed in accordance with an embodiment of the present invention, FIG. 2 is an overall elevational view of the various fittings and connecting devices used with the corrugating tubing in accordance with the embodiment of the present invention, FIG. 3 is an elevational view of a T connector for use with the device of FIG. 1.

DETAILED DESCRIPTION

Figure 1:
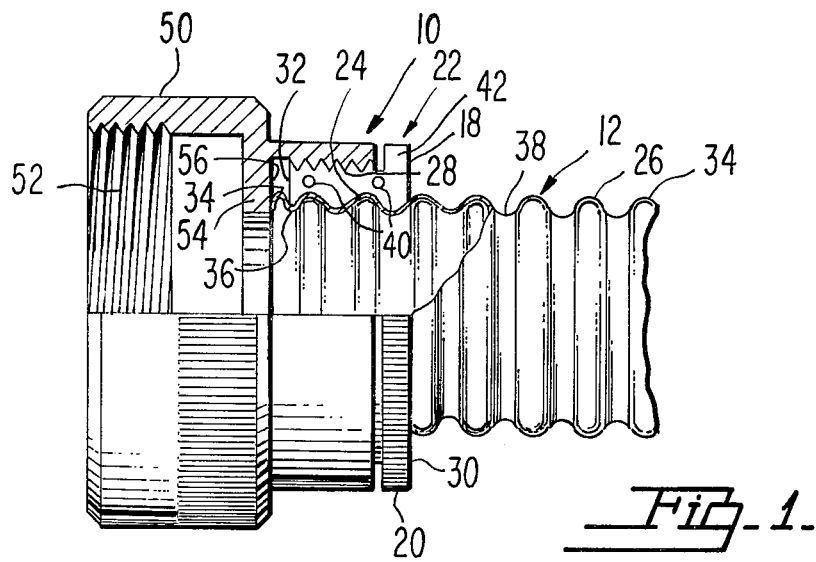

In FIG. 1, connector 10 is used with a plastic corrugated tubing 12 which houses a plurality of electrical leads (not shown). Connector 10 is formed of just a few pieces, but yet firmly and reliably secures the tubing 12 thereto. Connector 10 is used to interconnect tubing 12 to a mating fitting 14 (FIG. 2) secured in a suitable apparatus or fixture or the like. Connector 10 also may be connected to a harness transition such as the T device 16 of FIG. 3. While a T device is shown, a Y device, an elbow, or the like may also be used as is described below.

In FIG. 1, connector 10 comprises two mating identical halves 18 and 20 which together form a split ring 22. Each half, 18 and 20, has one surface thereof formed into a plurality of corrugations 24 which mate with the external surface 26 of tube 12. Each half 18 and 20 is formed with an external dual lead threaded surface 28 whose axis is substantially parallel to the longitudinal axis of tube 12. The dual lead arrangement permits both halves 18 and 20 to be made identical. A depending flange 30 is formed around the halves 18 and 20 with a knurled exterior surface to provide a suitable gripping means to the hand of an operator when using the connector 10 in a manner to be explained.

The end of halves 18 and 20 opposite the flange 30 end terminates in a planar surface on ring 22 forming face 32. Face 32 is spaced with respect to the crest 34 of the corrugations on tube 12 so as to intersect the tubing at a point disposed intermediate adjacent crests 34. The edge 36 of ring 22 is disposed within a trough 38 of the corrugations on tube 12. Therefore, whenever ring 22 is spaced contiguous with tube 12 at crest 34 an end of tube 12 protruding beyond face 32 will be adjacent to face 32, as shown.

To prevent axial translation of one half 18 with respect to the other half 20 of ring 22, complementary holes 40 and projections (not shown) are disposed in facing surfaces 42 of halves 18 and 20. Thus, each half 18 and 20 will have a pair of holes 40 on one surface 42, while the complementary surface of that half (not shown) has two projections of substantially the same size as holes 40. The same arrangement is provided in half 20.

Figure 2:
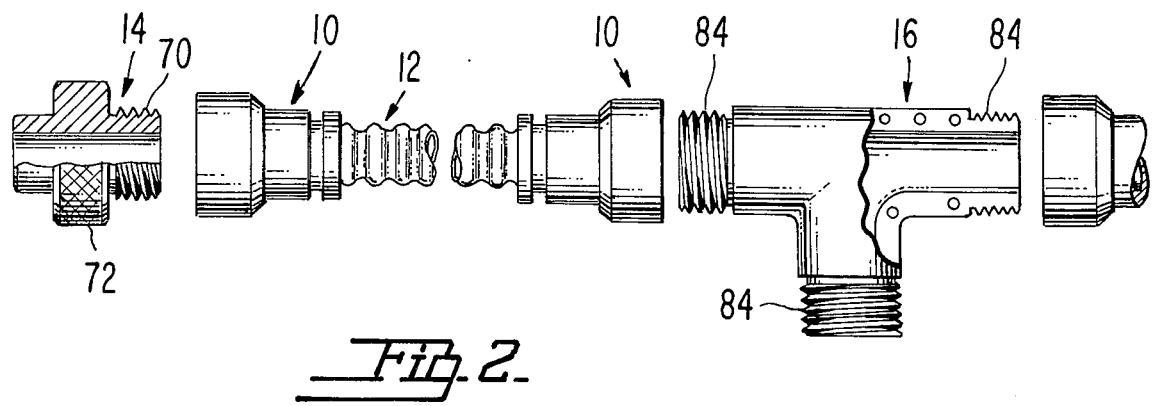

Threaded to threads 28 on ring 22 is member 50. Member 50 is generally cylindrical with an internal thread disposed at one end for threading member 50 to ring 22, as shown in FIG. 1. At the other end of member 50 is a connector rim having an internal thread 52 which mates with corresponding fitting 14 (FIG. 2). Depending radially inwardly from the outer periphery of member 50 is a flange 54. Flange 54 has a face 56 which is coextensive with face 32 on ring 22. Preferably flange 54 depends inwardly a greater distance than the inner diameter of the corrugated surface 24 on ring 22.

As a result, the inner diameter of flange 54 is about the same size as the inner diameter of troughs 38 of tube 12. When member 50 is threaded on ring 22, it is thus apparent that surface 56 on flange 54 is translated toward and away from surface 32 on ring 22. The surfaces 56 and 32 form a vice for gripping the extending end including crest portion 34 of the corrugation on tube 12 therebetween as shown in FIG. 1.

To use the connector 10 of FIG. 1, the halves 18 and 20 are assembled about tube 12 adjacent one end thereof so that one corrugation at the end projects beyond surface 32 of ring 22. Member 50 is then threaded on threads 28, as shown, until surface 56 of flange 34 abuts against the projecting end of tube 12. The operator continues to thread member 50 toward ring 22 so as to crushably clamp the projecting end of tube 12 between faces 32 and 56. When the tube 12 projecting end thereof is tightly clamped between faces 32 and 56, the tube 12 is then firmly secured to connector 10. While only three parts are utilized, halves 18 and 20 and member 50 provide a tight connection between tube 12 and a suitable fitting 14, FIG. 2.

In connecting the tubing 12 to a wire harness assembly or the like, fittings 10 of FIG. 2 are connected to tubing 12 at both ends of tubing 12, as shown. Connectors 10 are connected to the tubing 12 in a manner described above with respect to FIG. 1. Suitable fitting 14, having a mating external thread 70 which is complementary to the thread 52 of member 50 on connector 10, is secured to connector 10. Fitting 14 is also connected to a suitable apparatus. Knurled surface 72 on fitting 14 permits an operator to readily assemble fitting 14 by hand to connector 10.

Should the wiring harness form a T connection therein, it should be appreciated that a conventional T type fitting or transition cannot be placed over the harness since the harness is preformed. Yet it is still desirable to attach a second tube 12 to each leg of the T on the harness. To do this a split transition T 16 is provided.

Figure 3:
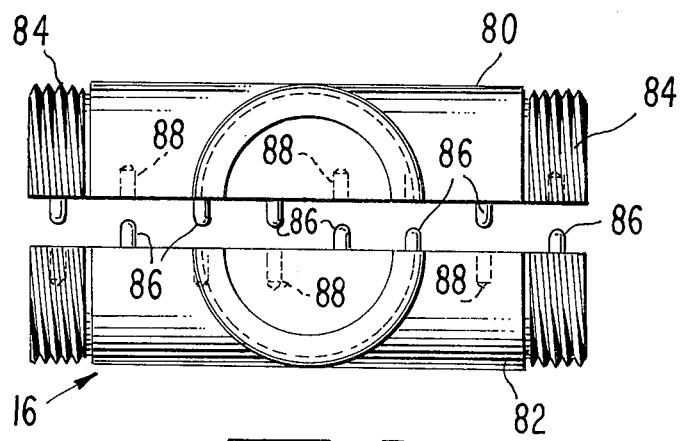

In FIG. 3 the split T comprises two identical halves 80 and 82 which are mirror images of each other. Preferably, these halves are made of suitable thermoplastic material which is of substantially the same thermal coefficient of expansion of plastic tube 12. This permits use of the T 16 in an environment exhibiting large temperature fluctuations. The T 16 comprises a half T-shaped cylindrical member with threads 84 disposed about the end external diameter of each T leg. In addition, a plurality of molded projections 86 are formed integral with each half 80 and 82. A like plurality of holes 88 are formed in each half 80 and 82 of the T. The holes 88 and projections 86 are spaced in an aligned fashion on each half. When the two halves 80 and 82 are placed together, the projections 86 and holes 88 mate, and no axial displacement of the two halves may occur. Threaded portions 84 at each end are threaded to the corresponding connector 10. Once connected, the halves 80 and 82 cannot separate and are locked together.

In a similar manner, a split elbow and many other desired transitions may be provided for a wiring harness by providing mating complementary halves in the transitions. Each half of the transitions, such as the T transition 16, are made of molded thermoplastic material and are relatively inexpensive to manufacture. Since the connector 10 is made of only a few parts while providing an extremely reliable connection to tube 12, a relatively inexpensive interconnection of fittings and connectors are provided for use with corrugated tubing 12.

What is claimed is:

1. In combination:

a first annular member adapted to receive an annular corrugated deformable conduit comprising two identical halves having at least one annular corrugation formed in an internal surface thereof and terminating in an end face intersecting said surface, said end face terminating at and intersecting said one corrugation solely along the crest of said one corrugation so that a portion of said conduit extends beyond said end face when said first member is disposed about said conduit, said first annular member having an external screw thread coaxial with said corrugation and comprising two identical interdigitized helical screw threads arranged to form a single externally threaded member, the screw thread on each half being identical to the screw thread on the other half and interchangeable therewith, and a second annular member having a surface thereof coextensive with and facing said end face, said second annular member having an internal thread comprising two interdigitized helical threads complementing and arranged to couple with said external helical screw threads, said screw threads being arranged to cause said first and second members to translate said end face toward said facing surface whereby said second member secures said two halves together solely by way of said internal thread, whereby said extending end portion is crushed between said end face and said facing surface thereby firmly securing said conduit to said first and second members, and connector engaging means formed in said second member.

2. The combination of claim 1 further including a hollow tubular member made of two identical halves, each half having at least one projection and at least one projection receiving hole disposed therein, the hole in onehalf receiving the complementary spaced projection in the other half, said hollow member including connector engaging means disposed at at least one end thereof for engaging said connector engaging means formed in said second member.

* * * * *